United States Patent
Hasegawa et al.

(10) Patent No.: US 7,212,383 B2
(45) Date of Patent: May 1, 2007

(54) MAGNETIC SENSING ELEMENT INCLUDING A PAIR OF ANTIFERROMAGNETIC LAYERS SEPARATED BY SPACER SECTION IN TRACK WIDTH DIRECTION AND METHOD FOR FABRICATING SAME

(75) Inventors: Naoya Hasegawa, Niigata-ken (JP); Eiji Umetsu, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 579 days.

(21) Appl. No.: 10/755,698

(22) Filed: Jan. 12, 2004

(65) Prior Publication Data
US 2004/0141257 A1 Jul. 22, 2004

(30) Foreign Application Priority Data
Jan. 15, 2003 (JP) .............................. 2003-006633

(51) Int. Cl.
*G11B 5/39* (2006.01)
(52) U.S. Cl. .................................................. 360/324.1
(58) Field of Classification Search .............. 360/324.1
See application file for complete search history.

(56) References Cited

U.S. PATENT DOCUMENTS

| 6,023,395 A | 2/2000 | Dill et al. |
| 6,134,090 A | 10/2000 | Mao et al. |
| 6,396,668 B1 | 5/2002 | Mao et al. |
| 6,411,478 B1 | 6/2002 | Mao et al. |

*Primary Examiner*—William Klimowicz
*Assistant Examiner*—Mark Blouin
(74) *Attorney, Agent, or Firm*—Brinks Hofer Gilson & Lione

(57) ABSTRACT

Disclosed are a magnetic sensing element in which side reading can be prevented, read sensitivity can be improved, and gap narrowing is enabled, and a method for fabricating the same. A magnetic sensing element includes a pair of first antiferromagnetic layers separated by a first spacer section. A first spacer layer is disposed in the first spacer section. The first spacer layer has the same composition as that of the first antiferromagnetic layers, and has a disordered crystal structure with a thickness that is smaller than that of the first antiferromagnetic layers. A first free magnetic layer is disposed on the continuous surface including the upper surfaces of the first antiferromagnetic layers and the first spacer layers. The magnetic sensing element also includes a nonmagnetic interlayer, a second free magnetic layer, and a pair of second antiferromagnetic layers separated by a second spacer section on the second free magnetic layer.

6 Claims, 9 Drawing Sheets

MAGNETIC SENSING ELEMENT INCLUDING A PAIR OF ANTIFERROMAGNETIC LAYERS SEPARATED BY SPACER SECTION IN TRACK WIDTH DIRECTION AND METHOD FOR FABRICATING SAME

This application claims the benefit of priority to Japanese Patent Application No. 2003-006633 herein incorporated by reference.

BACKGROUND OF THE INVENTION

1. Field of the Invention

The present invention relates to magnetic sensing elements used for hard disk drives, magnetic sensors, etc. More particularly, the invention relates to a magnetic sensing element in which side reading can be prevented, read sensitivity can be improved, and gap narrowing is enabled, and which can be easily and properly fabricated, and to a method for fabricating such a magnetic sensing element.

2. Description of the Related Art

Japanese Unexamined Patent Application Publication No. 9-128714 (patent document 1) discloses a magnetic transducer in which a plurality of ferromagnetic layers and spacer layers are laminated in the thickness direction, each spacer layer being interposed between the two adjacent ferromagnetic layers, and as means for controlling the magnetizations of the individual ferromagnetic layers, exchange coupling layers are placed adjacent to the top and bottom ferromagnetic layers.

According to patent document 1, the exchange coupling layers are composed of FeMn, NiMn, or the like. By producing exchange coupling magnetic fields between the top ferromagnetic layer and its adjacent exchange coupling layers and between the bottom ferromagnetic layer and its adjacent exchange coupling layers, the magnetization directions of the individual ferromagnetic layers are controlled.

The exchange coupling layers are formed on a substrate with a predetermined space therebetween, and the ferromagnetic layer is deposited over the substrate and the exchange coupling layers which protrude from the substrate. The spacer layers and the ferromagnetic layers are alternately deposited further thereon.

That is, according to patent document 1, the ferromagnetic layers and the spacer layers are deposited on an uneven surface.

However, if the ferromagnetic layers and the spacer layers are deposited on an uneven surface, it is not possible to form the ferromagnetic layers and the spacer layers with predetermined thicknesses, and also the following problems occur.

That is, the magnetization of the central region of the ferromagnetic layer disposed between the exchange coupling layers is also easily pinned at the sides by extra magnetic fields from the exchange coupling layers, which may result in a decrease in sensitivity to an external magnetic field.

In the structure of the magnetic transducer in patent document 1, there is also a possibility that the magnetization of the ferromagnetic layer disposed on the exchange coupling layer, which should be strongly pinned, may be easily rotated in response to an external magnetic field.

Although patent document 1 does not disclose a specific fabrication method, a fabrication method can be assumed from the structure of the magnetic transducer of patent document 1 in which the exchange coupling layers are formed with a predetermined space therebetween in the track width direction on the substrate, and then the ferromagnetic layers and the spacer layers are deposited. That is, since it is not possible to form the exchange coupling layers and the ferromagnetic layer continuously in the same chamber, the magnitudes of the exchange coupling magnetic fields produced between the ferromagnetic layer and the exchange coupling layers are weak. Consequently, the magnetizations of the side regions of the ferromagnetic layer are easily rotated in response to the external magnetic field, which may result in side reading.

The magnetizations of the individual ferromagnetic layers are thought to be not properly controlled simply by depositing the individual layers. That is, it is unclear from the content of patent document 1 how the use of the magnetic transducer is implemented.

SUMMARY OF THE INVENTION

The present invention has been achieved to overcome the problems associated with the conventional technique. It is an object of the present invention to provide a magnetic sensing element in which side reading can be prevented, read sensitivity can be improved, and gap narrowing is enabled, and which can be easily and properly fabricated, and to a method for fabricating such a magnetic sensing element.

In one aspect of the present invention, a magnetic sensing element includes a pair of first antiferromagnetic layers separated by a first spacer section having a predetermined distance in the track width direction; a first spacer layer having a disordered crystal structure disposed in the first spacer section, the first spacer layer having the same composition as that of the first antiferromagnetic layers and having a thickness that is smaller than that of the first antiferromagnetic layers; a first free magnetic layer disposed over the first antiferromagnetic layers and the first spacer layer; a nonmagnetic interlayer disposed on the first free magnetic layer; a second free magnetic layer disposed on the nonmagnetic interlayer; a pair of second antiferromagnetic layers separated by a second spacer section having the predetermined distance in the track width direction on the second free magnetic layer. The upper surfaces of the first antiferromagnetic layers and the upper surface of the first spacer layer form a continuous surface, and the first free magnetic layer is disposed on the continuous surface. The magnetization directions of the first free magnetic layer and the second free magnetic layer are rotated in response to an external magnetic field, causing a change in resistance of the magnetic sensing element.

In the magnetic sensing element of the present invention, a pair of first antiferromagnetic layers and a pair of second antiferromagnetic layers for aligning the magnetizations of the first free magnetic layer and the second free magnetic layer are formed with the first spacer section and the second spacer section therebetween, respectively, each of the first spacer section and the second spacer section having a predetermined distance in the track width direction. The magnetization direction of the central region in the track width direction of the first free magnetic layer located on the first spacer section sandwiched between the pair of first antiferromagnetic layers and the magnetization direction of the central region in the track width direction of the second free magnetic layer located beneath the second spacer region are rotated in response to the external magnetic field.

The first spacer layer having the disordered crystal structure is formed in the first spacer section, the first spacer layer having the same composition as that of the first antiferromagnetic layers and having a thickness that is smaller than that of the first antiferromagnetic layers. By providing the first spacer layer in the first spacer section, as will be described below with respect to a fabrication method, it is possible to produce an exchange coupling magnetic field with a proper magnitude between each of the first antiferromagnetic layers and each side region of the first free magnetic layer, and thereby side reading can be prevented. In the present invention, instead of a multilayer structure in which an antiferromagnetic layer for pinning the magnetization of a pinned magnetic layer, the pinned magnetic layer, a nonmagnetic layer, and a free magnetic layer are laminated as in the conventional spin-valve thin-film element, a structure is employed in which thick antiferromagnetic layers are not provided below the central region of the first free magnetic layer and above the central region of the second free magnetic layer. Consequently, gap narrowing can be achieved appropriately.

The magnetic sensing element may further include a second spacer layer disposed in the second spacer section in contact with the second free magnetic layer, the second spacer layer having the same composition as that of the second antiferromagnetic layers, having a thickness that is smaller than that of the second antiferromagnetic layers, and having a disordered crystal structure.

In such a case, the thickness of the first spacer layer is preferably 5 Å to 50 Å, and the thickness of the second spacer layer is preferably 5 Å to 50 Å.

When the first spacer layer or the second spacer layer is formed with the thickness described above, the disordered lattice is not transformed into the ordered lattice in the first spacer section or the second spacer section even if annealing is performed in a magnetic field, and it is possible to maintain the disordered crystal structure which does not exhibit antiferromagnetism in the first spacer section or the second spacer section.

The magnetic sensing element may further include a bias layer composed of a hard magnetic material extending behind the first free magnetic layer and the second free magnetic layer, in the height direction, with an insulating layer therebetween.

In such a construction, the magnetization directions of the first free magnetic layer and the second free magnetic layer are easily oriented so as to be substantially orthogonal to each other. Consequently, it is possible to achieve satisfactory symmetry of the output of the magnetic sensing element and also it is possible to improve magnetic field sensitivity.

Preferably, the continuous surface is a planarized surface.

In such a construction, since the first free magnetic layer is disposed on the planarized continuous surface, the first free magnetic layer and the second free magnetic layer deposited above the first free magnetic layer can be formed flatly. Consequently, extra static magnetic fields, etc., are not applied to the central region of the first free magnetic layer, and the magnetization of the central region of the first free magnetic layer is sensitively rotated in response to an external magnetic field.

In another aspect of the present invention, a method for fabricating a magnetic sensing element includes the steps of (a) forming recesses with a predetermined depth in the side regions in the track width direction of a substrate; (b) forming first antiferromagnetic layers in the recesses and continuously forming a first nonmagnetic layer composed of a noble metal and/or Cr over the first antiferromagnetic layers; (c) removing the first nonmagnetic layers to expose the upper surfaces of the first antiferromagnetic layers and the upper surface of the substrate located between the first antiferromagnetic layers, and forming a first spacer layer over the upper surfaces of the first antiferromagnetic layers and the upper surface of the substrate, the first spacer layer having the same composition as that of the first antiferromagnetic layers and having a disordered crystal structure with a thickness that is smaller than that of the first antiferromagnetic layers, the first spacer layer overlying the first antiferromagnetic layers being integrated into the first antiferromagnetic layers; (d) depositing a first free magnetic layer, a nonmagnetic interlayer, and a second free magnetic layer in that order on the first spacer layer and the first antiferromagnetic layers, and performing an annealing process in a first magnetic field to produce an exchange coupling magnetic field between the first free magnetic layer and each of the first antiferromagnetic layers so that the magnetization direction of the first free magnetic layer is aligned in a predetermined direction; and (e) forming a pair of second antiferromagnetic layers on the second free magnetic layer, the second antiferromagnetic layers being separated by a spacer section having a predetermined distance in the track width direction, and performing an annealing process in a second magnetic field so that the magnetization direction of the second free magnetic layer is oriented in a direction antiparallel to or substantially orthogonal to the magnetization direction of the first free magnetic layer.

In the magnetic sensing element fabricated by the method of the present invention, a pair of first antiferromagnetic layers and a pair of second antiferromagnetic layers for aligning the magnetization directions of the first free magnetic layer and the second free magnetic layer, respectively, are formed with a first spacer section and a second spacer section, each having a predetermined distance in the track width direction, therebetween. In the central region in the track width direction of the first free magnetic layer facing the first spacer layer and in the central region in the track width direction of the second free magnetic layer, magnetization directions are rotated in response to an external magnetic field.

In the method of the present invention, the first nonmagnetic layer is formed over the first antiferromagnetic layers so as to protect the first antiferromagnetic layers from oxidation. After the first nonmagnetic layer is removed, the first spacer layer and the first free magnetic layer are continuously formed on the first antiferromagnetic layers. Both side regions of the first spacer layer are integrated into the first antiferromagnetic layers, and it is possible to produce an exchange coupling magnetic field of an appropriate magnitude between each first antiferromagnetic layer and each side region of the first free magnetic layer.

In the method of the present invention, it is possible to easily and properly fabricate a magnetic sensing element which has excellent read sensitivity and in which side reading can be prevented and gap narrowing is enabled.

In the magnetic sensing element fabricated by the method, the first spacer layer is formed over the first antiferromagnetic layers and the spacer section at a thickness that is smaller than that of the first antiferromagnetic layers. In the first spacer layer located on each first antiferromagnetic layer and in the first antiferromagnetic layer, at least some of the disordered lattices are transformed into the ordered lattices by the annealing process in the magnetic field, and thereby antiferromagnetism is exhibited. On the other hand, in the first spacer layer located in the spacer section, since the thickness of the first spacer layer is extremely small, even if the annealing process is performed in the magnetic field, the disordered lattices are not transformed into the ordered lattices, and the disordered crystal structure which does not exhibit antiferromagnetism is maintained.

In the method of the present invention, step (d) may further include forming a second spacer layer on the second free magnetic layer, the second spacer layer having the same composition as that of the second antiferromagnetic layers and having a disordered crystal structure with a thickness that is smaller than that of the second antiferromagnetic layers, and forming a second nonmagnetic layer composed of a noble metal and/or Cr over the second spacer layer before performing the annealing process in the first magnetic field; and step (e) may further include removing the second nonmagnetic layer, forming at least a continuous second antiferromagnetic layer on the second spacer layer, forming mask layers with a predetermined space in the track width direction therebetween on the continuous second antiferromagnetic layer directly or through another layer, removing a portion of the continuous second antiferromagnetic layer not covered with the mask layers to expose the second spacer layer before performing the annealing process in the second magnetic field.

In step (b) and/or step (d), preferably, the noble metal is at least one metal selected from the group consisting of Ru, Re, Pd, Os, Ir, Pt, Au, Rh, and Cu.

In the present invention, since the first nonmagnetic layer deposited over the first antiferromagnetic layers in step (b) or the second nonmagnetic layer deposited over the continuous second antiferromagnetic layer is composed of the noble metal and/or Cr, a satisfactory oxidation-inhibiting effect is achieved even if the thickness of the nonmagnetic layer is small.

Consequently, in step (b) and/or step (d), the thickness of each of the first nonmagnetic layer and the second nonmagnetic layer may be set at 3 Å to 10 Å.

In step (c) and step (d), the thickness of each of the first spacer layer and the second spacer layer may be set at 5 Å to 50 Å.

If the first spacer layer and the second spacer layer are formed at the thicknesses described above, even if the annealing processes are performed in the magnetic fields, in the spacer sections, the disordered lattices are not transformed into the ordered lattices, and the disordered crystal structure which does not exhibit antiferromagnetism is maintained.

The method of the present invention may further include, after step (e), the step of forming an insulating layer extending behind the first free magnetic layer and the second free magnetic layer in the height direction, and forming a bias layer behind the insulating layer, the bias layer being composed of a hard magnetic material.

In the magnetic sensing element fabricated by the method described above, the magnetization directions of the first free magnetic layer and the second free magnetic layer can be easily oriented so as to be substantially orthogonal to each other. Consequently, it is possible to achieve satisfactory symmetry of the output of the magnetic sensing element and also it is possible to improve magnetic field sensitivity.

In step (c), preferably, the exposed upper surfaces of the first antiferromagnetic layers and the upper surface of the substrate between the first antiferromagnetic layers form a continuous planarized surface.

In such a construction, since the first spacer layer is deposited on the planarized surface, the first free magnetic layer and the second free magnetic layer deposited above the first free magnetic layer can also be formed flatly.

DESCRIPTION OF THE PREFERRED EMBODIMENTS

Figure 1:
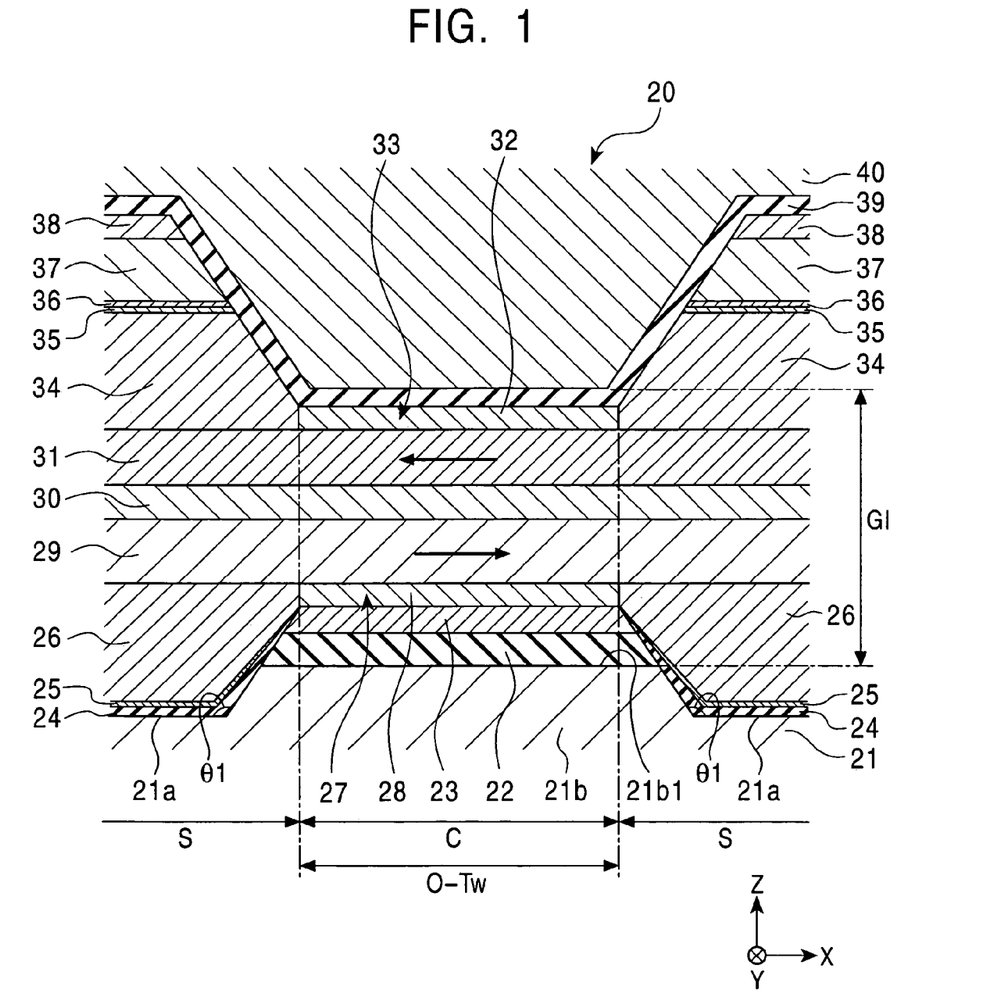
FIG. 1 is a partial sectional view which shows a magnetic sensing element in a first embodiment of the present invention.

FIG. 1 is a partial sectional view which shows a magnetic sensing element in a first embodiment of the present invention, viewed from the surface facing a recording medium.

A magnetic sensing element 20 shown in FIG. 1 is a MR head for reading external signals recorded in the recording medium. The surface facing the recording medium is, for example, a planar surface that is perpendicular to the planes of the thin films constituting the magnetic sensing element 20 and parallel to the track width direction of the magnetic sensing element. In FIG. 1, the surface facing the recording medium corresponds to a planar surface parallel to the X-Z plane.

When the magnetic sensing element 20 is used for a floating-type magnetic head, the surface facing the recording medium corresponds to a so-called "air bearing surface (ABS)".

The magnetic sensing element 20 is formed on the trailing end of a slider, for example, composed of alumina-titanium carbide ($Al_2O_3$—TiC). The slider is connected to an elastically deformable support composed of a stainless steel or the like at a surface opposite to the surface facing the recording medium, and thus a magnetic head device is fabricated.

The track width direction means the width direction of a region of which magnetization is rotated by an external magnetic field, i.e., the X direction in the drawing.

The recording medium travels in the Z direction. The leakage magnetic field from the recording medium is oriented in the Y direction.

An inductive head for writing may be deposited on the MR head for reading shown in FIG. 1.

In the magnetic sensing element 20 shown in FIG. 1, a pair of recesses 21a are formed with a predetermined distance therebetween in a lower shielding layer 21, and a lower gap layer 22 and a seed layer 23 are deposited on an upper surface 21b1 of a protrusion 21b interposed between the recesses 21a.

Insulating layers 24 and seed layers 25 are formed in the recesses 21a. First antiferromagnetic layers 26 are disposed with a first spacer section 27 having a predetermined distance therebetween on the seed layers 25. The upper surface of the first antiferromagnetic layer 26 is located higher than the upper surface of the seed layer 23.

As the thickness of the first antiferromagnetic layer 26 in the vicinity of a central region (track width region) C of the magnetic sensing element 20 is increased, side reading can be more effectively reduced. For that purpose, an angle θ1 between the bottom face and the side face of the recess 21a is preferably set at 90° to 120°.

In the first spacer section 27 interposed between the pair of first antiferromagnetic layers 26, a first spacer layer 28 is disposed on the seed layer 23, the first spacer layer 28 having the same composition as that of the first antiferromagnetic layers 26, having a thickness that is smaller than that of the first antiferromagnetic layers 26, and having a disordered crystal structure. As shown in FIG. 1, the first antiferromagnetic layers 26 are disposed with the first spacer section 27 therebetween in the track width direction (X direction), and the distance in the track width direction between the first antiferromagnetic layers 26 corresponds to an optical track width O-Tw.

The upper surface of the first spacer layer 28 and the upper surfaces of the first antiferromagnetic layers 26 form a continuous planarized surface. A first free magnetic layer 29, a nonmagnetic interlayer 30, and a second free magnetic layer 31 are deposited in that order on the upper surface of the first spacer layer 28 and the upper surfaces of the first antiferromagnetic layers 26.

A pair of second antiferromagnetic layers 34 are formed with a second spacer section 33 having a predetermined distance therebetween on the second free magnetic layer 31. A second spacer layer 32 having the same composition as that of the second antiferromagnetic layers 34, having a thickness that is smaller than that of the second antiferromagnetic layers 34, and having a disordered crystal structure is formed in the second spacer section 33. It is not always necessary to form the second spacer layer 32 in the second spacer section 33.

Stopper layers 35, protective layers 36, and electrode layers 37 are disposed on the second antiferromagnetic layers 34.

An upper gap layer 39 and an upper shielding layer 40 are deposited on the electrode layers 37 with protective layers 38 therebetween. The width in the track width direction between the second antiferromagnetic layers 34 is equal to the optical track width O-Tw.

The lower shielding layer 21 and the upper shielding layer 40 are composed of magnetic materials, such as NiFe. The lower gap layer 22, the upper gap layer 39, and insulating layers 24 are composed of insulating materials, such as alumina ($Al_2O_3$) or $SiO_2$.

The seed layers 23 and 25 are composed of a nonmagnetic material having a body-centered cubic (bcc) crystal structure, such as Cr, a NiFeCr alloy having a face-centered cubic (fcc) structure, or Ta having a structure that is close to amorphous. The seed layers 23 and 25 align the crystal orientations of the first spacer layer 28, the first free magnetic layer 29, or the first antiferromagnetic layers 26 formed thereon, improve soft magnetic properties of the first free magnetic layer 29, and decrease the resistivity. The seed layers 23 and 25 also increase the grain sizes of the first antiferromagnetic layers 26 and improve the distribution of the blocking temperature.

The first antiferromagnetic layers 26 and the second antiferromagnetic layers 34 are composed of a PtMn alloy, X—Mn alloy, wherein X is at least one element selected from the group consisting of Pd, Ir, Rh, Ru, and Os, or Pt—Mn—X' alloy, wherein X' is at least one element selected from the group consisting of Pd, Ir, Rh, Ru, Au, Ag, Os, Cr, Ni, Ar, Ne, Xe, and Kr.

Although the alloys described above have a disordered face-centered cubic (fcc) structure immediately after being deposited, the structure is transformed into a CuAuI-type ordered face-centered tetragonal (fct) structure by annealing.

Each of the first antiferromagnetic layers 26 and the second antiferromagnetic layers 34 has a thickness of 80 Å to 300 Å, for example, 200 Å.

In the PtMn alloy and the X—Mn alloy, the Pt content or the X content is preferably in the range of 37 to 63 atomic percent, and more preferably in the range of 47 to 57 atomic percent.

In the Pt—Mn—X' alloy, the X'+Pt content is preferably in the range of 37 to 63 atomic percent, and more preferably in the range of 47 to 57 atomic percent. Furthermore, in the Pt—Mn—X' alloy, the X' content is preferably in the range of 0.2 to 10 atomic percent. However, when X' is at least one of Pd, Ir, Rh, Ru, and Os, the X' content is preferably in the range of 0.2 to 40 atomic percent.

By using such an alloy and performing an annealing process, an antiferromagnetic layer producing a large exchange coupling magnetic field can be obtained. In particular, by using the PtMn alloy, it is possible to obtain first antiferromagnetic layers 25 and second antiferromagnetic layers 34 which have an exchange coupling magnetic field of 48 kA/m or more, for example, exceeding 64 kA/m, and which have a significantly high blocking temperature of 380° C., the blocking temperature being a temperature at which the exchange coupling magnetic field is lost.

In the present invention, even if the first antiferromagnetic layers 26 and the second antiferromagnetic layers 34 are composed of the PtMn alloy, X—Mn alloy, or Pt—Mn—X' alloy with the same compositional ratio, it is possible to orient the magnetization direction of the first free magnetic layer 29 and the magnetization direction of the second free magnetic layer 31 antiparallel or substantially orthogonal to each other.

The thickness of the first spacer layer 28 is smaller than the thickness of the first antiferromagnetic layer 26. Preferably, the thickness of the first spacer layer 28 is, for example, 5 Å to 50 Å. When the first spacer layer 28 is formed at the thickness described above, because of extreme thinness of the first spacer layer 28, the disordered lattice is not transformed into the ordered lattice in the first spacer layer 28 formed in the first spacer section even by performing the annealing process in the magnetic field, and the disordered crystal structure which does not exhibit antiferromagnetism is maintained.

The first free magnetic layer 29 and the second free magnetic layer 31 are composed of ferromagnetic materials, such as NiFe alloys, Co, CoFeNi alloys, CoFe alloys, and CoNi alloys. In particular, the first free magnetic layer 29 and the second free magnetic layer 31 are preferably composed of NiFe alloys, CoFe alloys, or CoFeNi alloys. Preferably, each of the first free magnetic layer 29 and the second free magnetic layer 31 has a thickness of about 30 Å to 50 Å. When each of the first free magnetic layer 29 and the second free magnetic layer 31 is composed of a CoFe alloy, the compositional ratio is, for example, 90 atomic percent of Co and 10 atomic percent of Fe.

Preferably, each of the first free magnetic layer 29 and the second free magnetic layer 31 includes two or three ferromagnetic layers. In the two-layered structure, for example, a NiFe/CoFe structure is used and the CoFe layer is provided on the nonmagnetic interlayer 30 side. Examples of three-layered structure include CoFe/NiFe/CoFe.

Alternatively, each of the first free magnetic layer 29 and the second free magnetic layer 31 may have a laminated ferrimagnetic structure including magnetic layers and an intermediate nonmagnetic layer, the magnetic layers having different magnetic thicknesses (Ms×t; product of saturation magnetization and thickness).

The nonmagnetic interlayer 30 prevents magnetic coupling between the first free magnetic layer 29 and the second free magnetic layer 31, and is preferably composed of a conductive nonmagnetic material, such as Cu, Cr, Au, or Ag. In particular, the nonmagnetic interlayer 30 is preferably composed of Cu. The nonmagnetic interlayer 30 has a thickness, for example, of about 18 Å to 30 Å.

The stopper layers 35 are composed of Cr or the like, and the protective layers 36 are composed of Ta or the like.

The electrode layers 37 may be formed using W, Ta, Cr, Cu, Rh, Ir, Ru, Au, or the like. The electrode layers 37 have a thickness of 300 Å to 1,000 Å.

In the magnetic sensing element shown in FIG. 1, an exchange anisotropic magnetic field is produced between each first antiferromagnetic layer 26 and each side region S of the first free magnetic layer 29 by annealing in a magnetic field. The magnetization direction of the side region S of the first free magnetic layer 29 is pinned in a track width direction (in the X direction) or at an angle of 45 degrees with respect to the X direction. However, in the first spacer section 27, i.e., in the central region C, the first antiferromagnetic layer 26 is not formed, and the first spacer layer 28 is formed at a thickness which maintains the disordered crystal structure, and thereby antiferromagnetism is not exhibited. Consequently, in the first free magnetic layer 29, although the magnetization is strongly pinned in each side region S, the magnetization of the central region C is arranged so that the magnetization direction is rotated in response to an external magnetic field.

An exchange anisotropic magnetic field is produced between each second antiferromagnetic layer 34 and each side region S of the second free magnetic layer 31 by annealing in a magnetic field. The magnetization direction of the side region S of the second free magnetic layer 31 is pinned antiparallel to the X direction or at an angle of 45 degrees with respect to the X direction. However, in the second spacer section 33, i.e., in the central region C, the second antiferromagnetic layer 34 is not formed, and the second spacer layer 32 is formed at a thickness which maintains the disordered crystal structure, and thereby antiferromagnetism is not exhibited. Consequently, in the second free magnetic layer 31, although the magnetization is strongly pinned in each side region S, the magnetization of the central region C is arranged so that the magnetization direction is rotated in response to an external magnetic field.

In the magnetic sensing element 20 shown in FIG. 1, the magnetization direction of the first free magnetic layer 29 is oriented in the X direction, and the magnetization direction of the second free magnetic layer 31 is oriented antiparallel to the X direction. In the magnetic sensing element 20 shown in FIG. 1, the upper surface of the first spacer layer 28 and the upper surfaces of the first antiferromagnetic layers 26 form a continuous planarized surface. Consequently, the first free magnetic layer 29 formed on the upper surface of the first spacer layer 28 and the upper surfaces of the first antiferromagnetic layers 26 and the second free magnetic layer 31 deposited above the first free magnetic layer 29 can be formed on the planarized surfaces. Supposing the first free magnetic layer 29 and the second free magnetic layer 31 are not planarized but curved, soft magnetic properties of the first free magnetic layer 29 and the second free magnetic layer 31 tend to be degraded in the vicinity of the sides of the curved sections.

In each side region S of the magnetic sensing element 20, the first free magnetic layer 29 is directly in contact with the first antiferromagnetic layers 26 without any other ferromagnetic layer therebetween. The second free magnetic layer 31 disposed above the first free magnetic layer 29 is directly in contact with the second antiferromagnetic layers 34 without any other ferromagnetic layer therebetween. Consequently, in the first free magnetic layer 29 and the second free magnetic layer 31, the magnetizations in the central region C are not affected by extra static magnetic fields, etc., from other ferromagnetic layers, and the magnetization in the central region C is not easily pinned, resulting in an improvement in read sensitivity.

In order to fabricate the magnetic sensing element 20, as will be described in detail in the fabrication method below, the first antiferromagnetic layers 26 are embedded in the recesses 21a, and after planarizing the upper surfaces of the first antiferromagnetic layers 26 and the upper surface of the seed layer 23, the first spacer layer 28 is deposited over the first antiferromagnetic layers 26 and the seed layer 23. In portions of the first spacer layer 28 formed on the first antiferromagnetic layers 26, the disordered lattices are transformed into the ordered lattices by the annealing process in the magnetic field, and thereby antiferromagnetism is exhibited. The portions are integrated into the first antiferromagnetic layers 26. Since the first spacer layer 28 and the first free magnetic layer 29 are continuously deposited, the first spacer layer 28 formed on each first antiferromagnetic layer 26 is integrated into the first antiferromagnetic layer 26 to form an antiferromagnetic layer. It is also possible to produce an exchange coupling magnetic field with a moderate magnitude between the first antiferromagnetic layer 26 and each side region S of the first free magnetic layer 29. Consequently, the magnetization of each side region S of the first free magnetic layer 29 can be strongly pinned in the track width direction, and it is possible to fabricate a magnetic sensing element in which side reading is prevented.

In the magnetic sensing element 20, a thick antiferromagnetic layer is not present in the central region C. Furthermore, the nonmagnetic interlayer 30 can be also formed at a uniform thickness over the planarized first free magnetic layer 29. Consequently, the overall thickness of the central region C of the magnetic sensing element can be decreased, and a gap length Gl can be decreased. The gap length Gl corresponds to a distance between the lower shielding layer 21 and the upper shielding layer 40 in the central region C.

Figure 2:
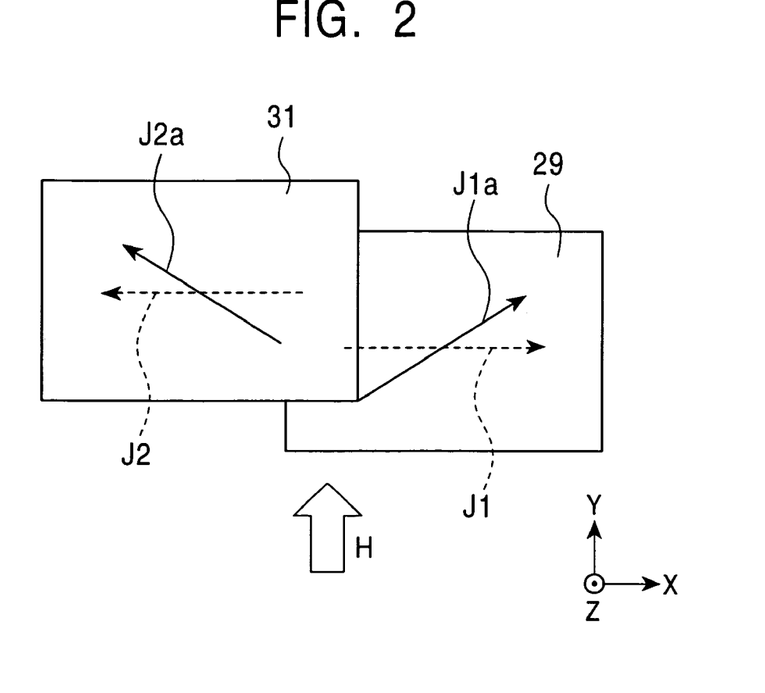
FIG. 2 is a schematic diagram which illustrates the principle of operation of a magnetic sensing element of the present invention.

FIG. 2 is a schematic plan view which shows the first free magnetic layer 29 and the second free magnetic layer 31 in the central region C. In the absence of an applied external magnetic field, the magnetizations of the first free magnetic layer 29 and the second free magnetic layer 31 are oriented in the J1 direction and in the J2 direction indicated by dotted lines, i.e., antiparallel to each other.

When an external magnetic field H is applied in the Y direction, the magnetizations the first free magnetic layer 29 and the second free magnetic layer 31 are rotated by the external magnetic field H and is oriented in the J1a direction and in the J2a direction, respectively. When the relative angle between the magnetization directions of the first free magnetic layer 29 and the second free magnetic layer 31 is changed as described above, the electrical resistance of the magnetic sensing element is changed. The external magnetic field is detected by a current change or a voltage change based on the change in the electrical resistance of the magnetic sensing element.

Figure 3:
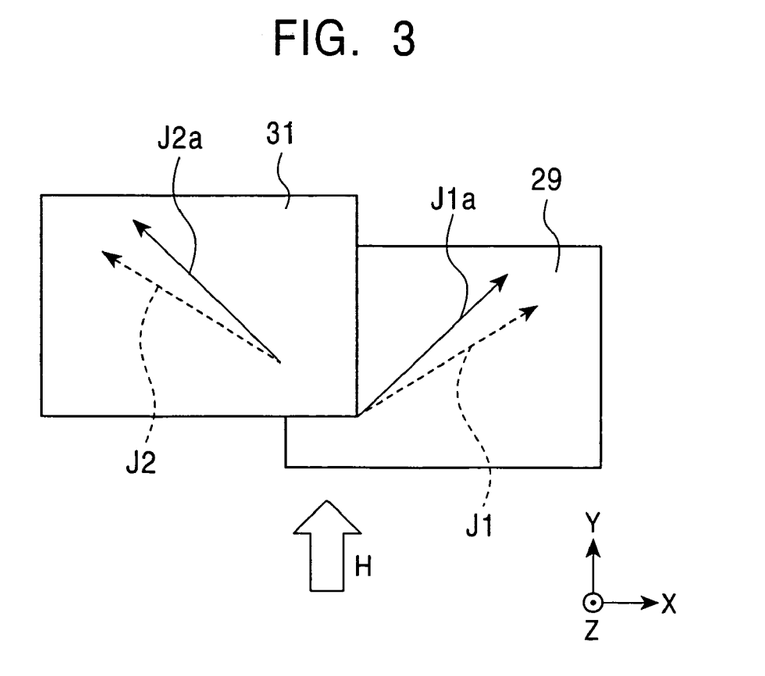
FIG. 3 is a schematic diagram which illustrates the principle of operation of a magnetic sensing element of the present invention.

In the absence of an applied magnetic field, preferably, the magnetization directions of the first free magnetic layer 29 and the second free magnetic layer 31 cross each other as shown in FIG. 3 because satisfactory symmetry and magnitude of the output are obtained.

In order to orient the magnetization directions of the first free magnetic layer 29 and the second free magnetic layer 31 substantially orthogonal to each other, a method may be employed in which a bias layer composed of a hard magnetic material is used.

Figure 4:
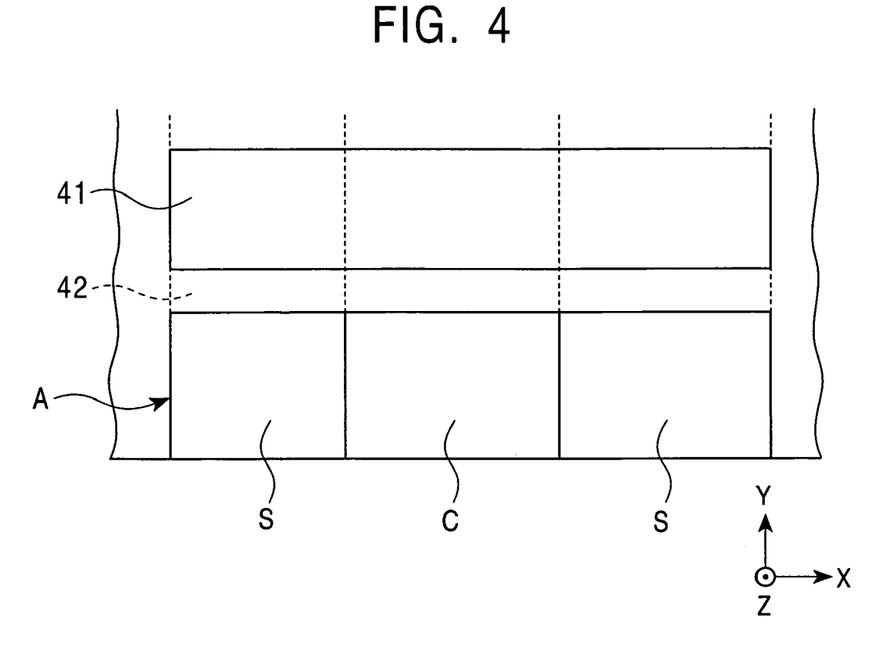
FIG. 4 is a partial plan view which shows a magnetic sensing element of the present invention including a hard bias layer.
Figure 5:
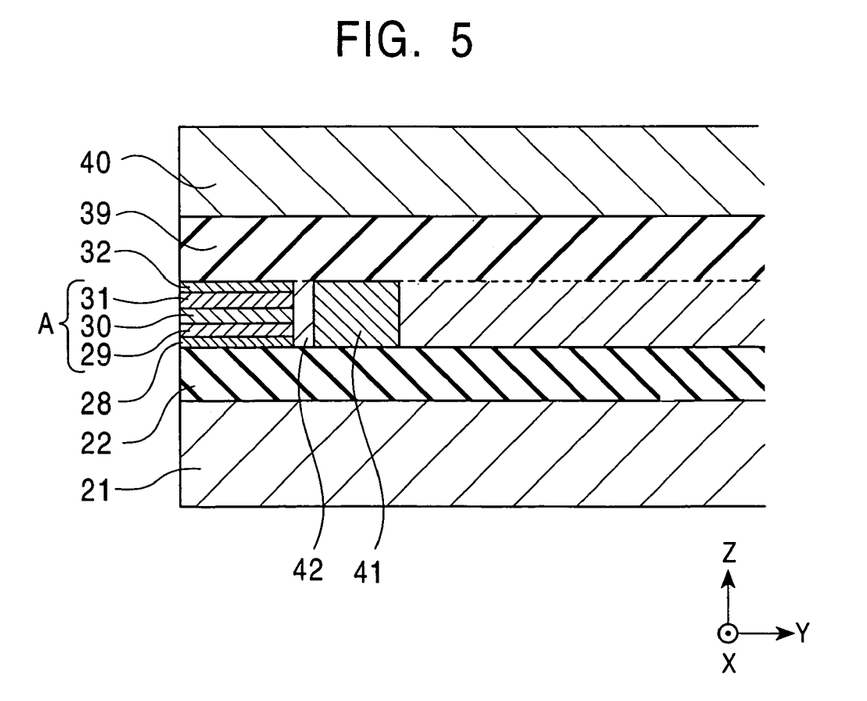
FIG. 5 is a partial longitudinal sectional view which shows a magnetic sensing element of the present invention including a hard bias layer.

FIG. 4 is a plan view which shows a laminate A including the first free magnetic layer 29, the nonmagnetic interlayer 30, and a second free magnetic layer 31, and a hard bias layer 41 composed of a hard magnetic material extending in the rear of the laminate A in the height direction (in the Y direction) in the magnetic sensing element shown in FIG. 1. FIG. 5 is a partial longitudinal sectional view which shows the laminate A, the hard bias layer 41, and the layers disposed thereon and therebeneath. In FIG. 5, the seed layer 23 is not shown.

An insulating layer 42 composed of alumina or $SiO_2$ is disposed between the laminate A and the hard bias layer 41. A static magnetic field is applied from the hard bias layer 41 to the laminate A and the magnetization direction of the central region C of the first free magnetic layer 29 and the magnetization direction of the central region C of the second free magnetic layer 31 are rotated in the Y direction so as to be substantially orthogonal to each other.

The hard bias layer 41 is preferably formed at least in the rear of the central regions C of the first free magnetic layer 29 and the second free magnetic layer 31. In FIG. 4, the hard bias layer 41 is also formed at the rear of the side regions S of the first free magnetic layer 29 and the second free magnetic layer 31. When the hard bias layer 41 also is formed in the side regions S of the first free magnetic layer 29 and the second free magnetic layer 31, the hard bias layer 41 and the electrode layers 37 must be electrically insulated from each other.

The magnetic sensing element 20 shown in FIG. 1 is a current-in-the-plane (CIP) magnetic sensing element in which a current applied from the electrode layers 37 into the magnetic sensing element flows parallel to the planes of the individual layers.

The present invention also includes a current-perpendicular-to-the-plane (CPP) magnetic sensing element in which electrodes layers are disposed on and under the magnetic sensing element and a current flows perpendicular to the planes of the individual layers of the magnetic sensing element.

Figure 6:
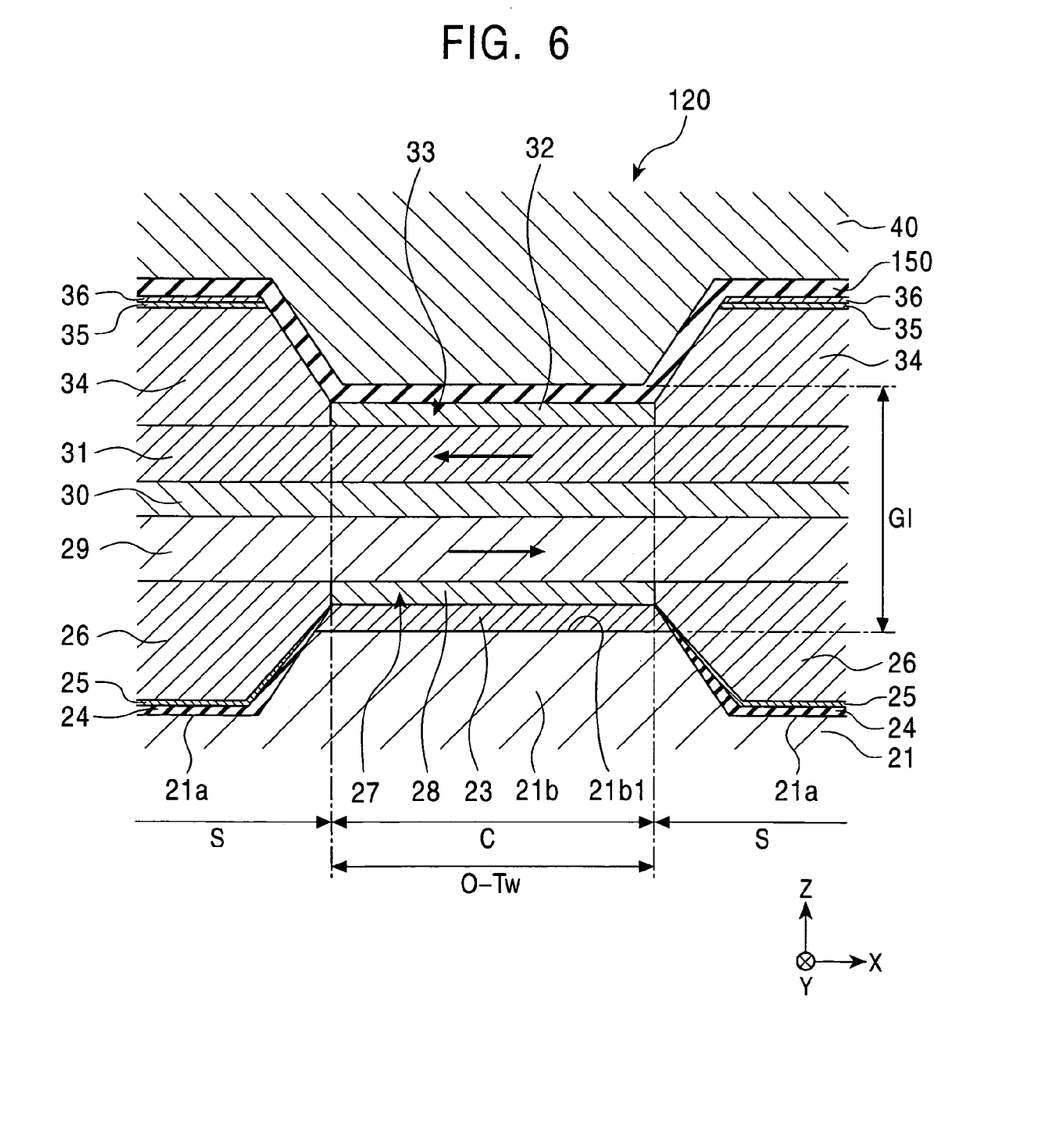
FIG. 6 is a partial sectional view which shows a magnetic sensing element in a second embodiment of the present invention.

FIG. 6 is a sectional view which shows a CPP magnetic sensing element having the same laminate structure as that of the magnetic sensing element 20.

A magnetic sensing element 120 shown in FIG. 6 is different from the magnetic sensing element 20 shown in FIG. 1 in two points. Firstly, without forming the lower gap layer 22, the lower shielding layer 21 is electrically connected to the first free magnetic layer 29 through the seed layer 23 and the lower shielding layer 21 also acts as an electrode layer. Secondly, without forming the upper gap layer, the upper shielding layer 40 is deposited on a pair of insulating layers 150 deposited with a distance therebetween on the second antiferromagnetic layers 34 through the stopper layers 35 and the protective layers 36 and the upper shielding layer 40 also acts as an electrode layer.

The CPP magnetic sensing element is thought to have a high magnetoresistance effect even at an optical track width of 0.1 μm or less, thus being suitable for track narrowing.

In the magnetic sensing element 20 or 120 shown in FIG. 1 or 6, the magnetization directions of the first free magnetic layer 29 and the second free magnetic layer 31 may be aligned at an angle with respect to the track width direction so as to cross each other.

A method for fabricating the magnetic sensing element shown in FIG. 1 will now be described.

FIGS. 7 to 13 are partial sectional views which show the steps in a fabrication process of the magnetic sensing element shown in FIG. 1, each viewed from the surface facing a recording medium. The layers represented by the same reference numerals as those of the layers shown in FIG. 1 are composed of the same materials.

Figure 7:
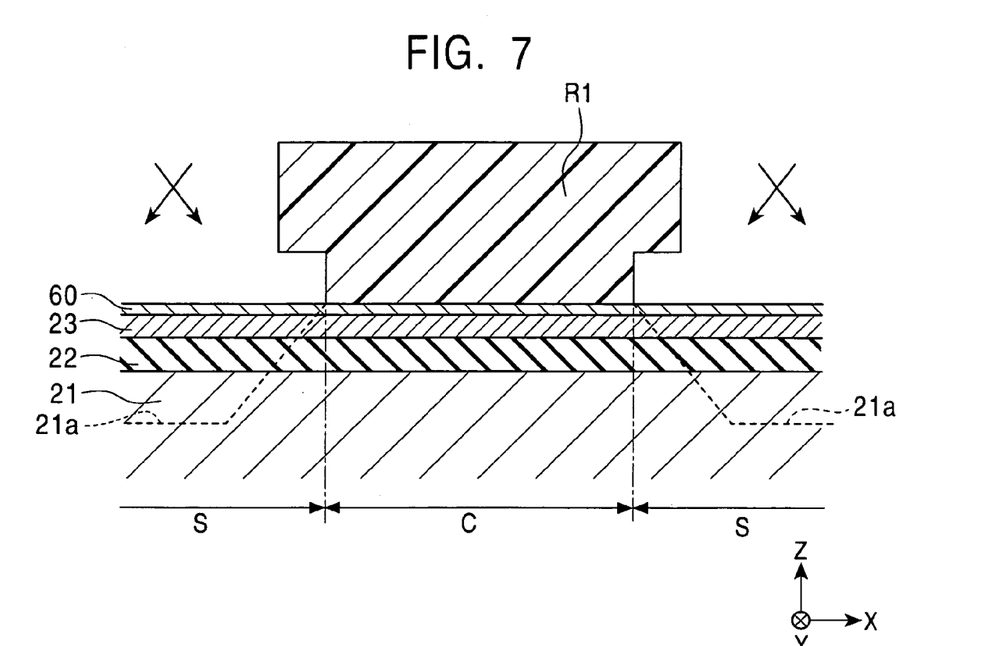
FIG. 7 is a sectional view which shows a step in a fabrication process of the magnetic sensing element shown in FIG. 1.

In the step shown in FIG. 7, a lower shielding layer 21, a lower gap layer 22, and a seed layer 23 are deposited in that order, and a protective layer 60 is deposited on the seed layer 23. The protective layer 60 prevents the seed layer 23, etc., from being oxidized and may be composed of Cr or the like. The protective layer 60 has a thickness of about 3 Å to 10 Å. The protective layer 60 may be omitted. However, in such a case, the seed layer 23 should be formed with a considerable thickness, anticipating the portion to be subjected to milling, in the step shown in FIG. 9.

Next, a resist layer R1 for a lift-off process is formed so as to cover the central region (track width region) C of the seed layer 23. Although the structure is exposed to air at this stage, the seed layer 23, etc., is prevented from being oxidized by air due to the presence of the protective layer 60. When the protective layer 60 is not deposited, the surface of the seed layer 23 is oxidized.

The side regions S of the seed layer 23, the lower gap layer 22, and the lower shielding layer 21 are removed by ion milling along dotted lines shown in FIG. 7. Recesses 21a are thereby formed in the lower shielding layer 21. An angle θ1 between the bottom face and the side face of the recess 21a is preferably set at 90° to 120°.

In the step shown in FIG. 7, preferably, the incidence angle of ion milling is, for example, 70° to 90° with respect to the surface of the seed layer 23.

Figure 8:
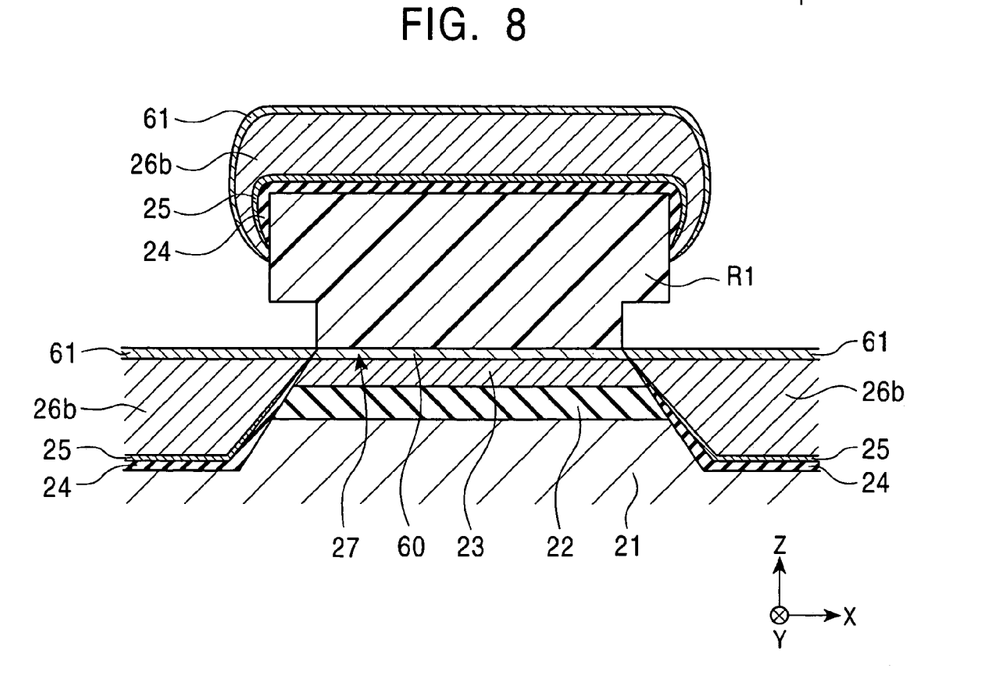
FIG. 8 is a sectional view which shows a step in the fabrication process subsequent to the step shown in FIG. 7.

In the step shown in FIG. 8, with the resist layer R1 being left on the protective layer 60, insulating layers 24, seed layers 25, first antiferromagnetic layers 26b, and first nonmagnetic layer 61 are continuously deposited by sputtering in the recesses 21a formed in the lower shielding layer 21. Consequently, a pair of first antiferromagnetic layers 26b are formed with a first spacer section 27 therebetween, the first spacer section 27 being disposed between the recesses 21a. In order to perform the sputtering, at least one of ion beam sputtering, long-throw sputtering, and collimation sputtering may be used. At this stage, the insulating layer 24, the seed layer 25, the first antiferromagnetic layer 26b, and the first nonmagnetic layer 61 are also deposited on the resist layer R1.

When the insulating layers 24 and the seed layers 25 are deposited, the incidence angle of sputtering is, for example, 30° to 70° with respect to the surface of the seed layer 23 (or the surface of the substrate). When the first antiferromagnetic layers 26b are deposited, the incidence angle of sputtering is, for example, 50° to 90° with respect to the surface of the seed layer 23 (or the surface of the substrate).

Figure 9:
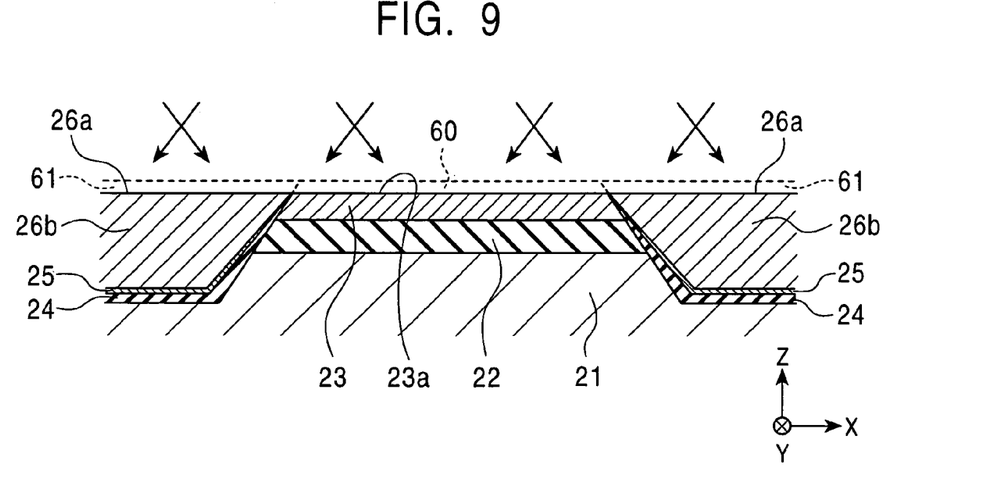
FIG. 9 is a sectional view which shows a step in the fabrication process subsequent to the step shown in FIG. 8.

The first nonmagnetic layer 61 acts as a protective layer for protecting the first antiferromagnetic layers 26b from oxidation until the step shown in FIG. 9 is carried out and is formed using a noble metal composed of at least one of Ru, Re, Pd, Os, Ir, Pt, Au, Rh, and Cu and/or Cr. The thickness of the first nonmagnetic layer 61 may be about 3 Å to 10 Å.

In the step shown in FIG. 9, the resist layer R1 is removed, and the protective layer 60 and the first nonmagnetic layers 61 are removed by ion milling to expose the surface of the seed layer 23 and the surfaces of the first antiferromagnetic layers 26b. In the ion milling process, ion milling with low energy may be performed. The reason for this is that, since the protective layer 60 and the first nonmagnetic layers 61 have been deposited with extremely small thicknesses of about 3 Å to 10 Å, removal of only the protective layer 60 and the first nonmagnetic layers 61 can be easily controlled.

Herein, ion milling with low energy is defined as ion milling using a beam of ions with a beam voltage (accelerating voltage) of less than 1,000 V. For example, a beam voltage of 100 to 500 V may be used. In this embodiment, an argon (Ar) ion beam with a low beam voltage of 200 V is used.

When the protective layer 60 is not formed in the step shown in FIG. 7, when the first nonmagnetic layers 61 are subjected to milling, the surface of the seed layer 23 is also subjected to milling. The seed layer 23 is composed of a NiFeCr alloy or Cr having a body-centered cubic (bcc) crystal structure or having a structure close to amorphous structure and is not easily oxidized. Even if oxidized, oxidization will not advance deeply. Therefore, when the first nonmagnetic layers 61 are subjected to milling, the oxide layer formed on the surface of the seed layer 23 is also removed.

The upper surfaces 26a of the first antiferromagnetic layers 26b and the upper surface 23a of the seed layer 23 which are exposed by ion milling with low energy are planarized.

Figure 10:
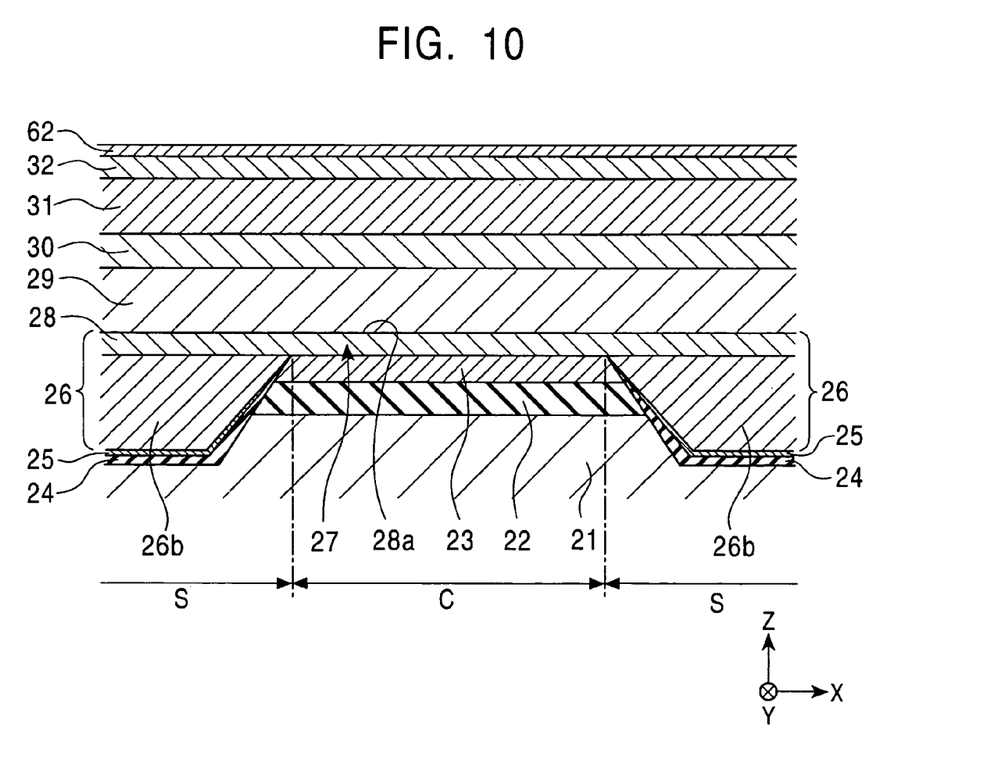
FIG. 10 is a sectional view which shows a step in the fabrication process subsequent to the step shown in FIG. 9.

Next, while maintaining the vacuum state from ion milling with low energy, as shown in FIG. 10, a first spacer layer 28, a first free magnetic layer 29, a nonmagnetic interlayer 30, a second free magnetic layer 31, a second spacer layer 32, and a second nonmagnetic layer 62 are continuously deposited. The thickness of the first spacer layer 28 is smaller than the thickness of the first antiferromagnetic layer 26b. Similarly, the thickness of the second spacer layer 32 is smaller than the thickness of the second antiferromagnetic layers 34b. Specifically, the thickness of each of the first spacer layer 28 and the second spacer layer 32 is preferably in the range of 5 Å to 50 Å. The first spacer layer 28 has the same composition as that of the first antiferromagnetic layers 26b. The second spacer layer 32 has the same composition as that of the second antiferromagnetic layers 34b which will be described below.

The second nonmagnetic layer 62 comprises a noble metal composed of at least one metal selected from the group consisting of Ru, Re, Pd, Os, Ir, Pt, Au, Rh, and Cu and/or Cr. The thickness of the second nonmagnetic layer 62 is in the range of 3 Å to 10 Å.

Since the first spacer layer 28 is formed on a planarized surface including the upper surfaces 26a of the first antiferromagnetic layers 26b and the upper surface 23a of the seed layer 23, the upper surface 28a of the first spacer layer 28 is also flat. Consequently, the first free magnetic layer 29 and the second free magnetic layer 31 are also formed flatly on the first spacer layer 28. Furthermore, the nonmagnetic interlayer 30 is also formed flatly.

Since the nonmagnetic interlayer 30 is formed with a uniform thickness on the planarized first free magnetic layer 29, the overall thickness of the magnetic sensing element in the central region C can be minimized.

An annealing process in a first magnetic field is then performed. Annealing is performed at a first annealing temperature while applying a first magnetic field in the track width direction (in the X direction). At this stage, in the portions of the first spacer layer 28 located on the antiferromagnetic layers 26b, i.e., in the side regions S, as well as in the first antiferromagnetic layers 26b, at least some of the disordered lattices are transformed into the ordered lattices, and thereby antiferromagnetism is exhibited.

That is, by performing the annealing process in the first magnetic field, the first spacer layers 28 formed on the first antiferromagnetic layers 26b are integrated into the first antiferromagnetic layers 26b to form first antiferromagnetic layers 26. An exchange coupling magnetic field Hex is generated between the first antiferromagnetic layer and the first free magnetic layer 29, and the magnetization of the first free magnetic layer 29 in each side region S is pinned at an angle of 45° relative to the X direction. For example, the first annealing temperature is set at 270° C., and the magnitude of the magnetic field is set at 800 kA/m.

In the spacer section 27, i.e., in the central region C, since the thickness of the first spacer layer 28 is extremely thin at 50 Å or less, even if the annealing process in the first magnetic field is performed, disordered lattices are not transformed into ordered lattices, and the disordered crystal structure which does not exhibit antiferromagnetism is maintained. Consequently, in each side region, an exchange anisotropic magnetic field is produced between the first free magnetic layer 29 and each first antiferromagnetic layer 26 formed by integration of the first spacer layer 28 and the first antiferromagnetic layer 26b due to the transformation into the ordered structure, and the magnetization direction of the first free magnetic layer 29 is pinned in the track width direction or at an angle of 45° relative to the track width direction. On the other hand, in the first spacer section 27, i.e., in the central region C, without the first antiferromagnetic layer 26b, only the first spacer layer 28 is formed at a thickness which maintains the disordered crystal structure, and antiferromagnetism is not exhibited. Consequently, in the side regions S of the first free magnetic layer 29, the magnetization is strongly pinned, while, in the central region C, the magnetization direction is rotated by an external magnetic field.

In the step shown in FIG. 10, the first spacer layer 28 and the first free magnetic layer 29 are continuously deposited. In general, in order to produce an exchange coupling magnetic field between an antiferromagnetic layer and a ferromagnetic layer (free magnetic layer), atoms in both layers must be in contact with each other, and the absence of atoms of extra materials is required. However, when the ferromagnetic layer (free magnetic layer) is formed on the antiferromagnetic layer not continuously and after the antiferromagnetic layer is exposed to air, atoms of extra materials, such as oxides, are present at the interface of both layers. It is not possible to produce a satisfactory exchange coupling magnetic field between both layers.

In the fabrication method of the present invention, the first nonmagnetic layers 61 are formed on the first antiferromagnetic layers 26b so that the first antiferromagnetic layers 26b are protected from oxidation. Subsequently, after the first nonmagnetic layers 61 are removed in a vacuum, the first spacer layer 28 and the first free magnetic layer 29 can be deposited continuously, and by the annealing process in the magnetic field, antiferromagnetism is imparted to the first spacer layer 28 formed on the first antiferromagnetic layer 26b. Consequently, it is possible to produce an exchange coupling magnetic field with an appropriate magnitude between the first spacer layer 28 and each side region S of the first free magnetic layer 29.

Figure 11:
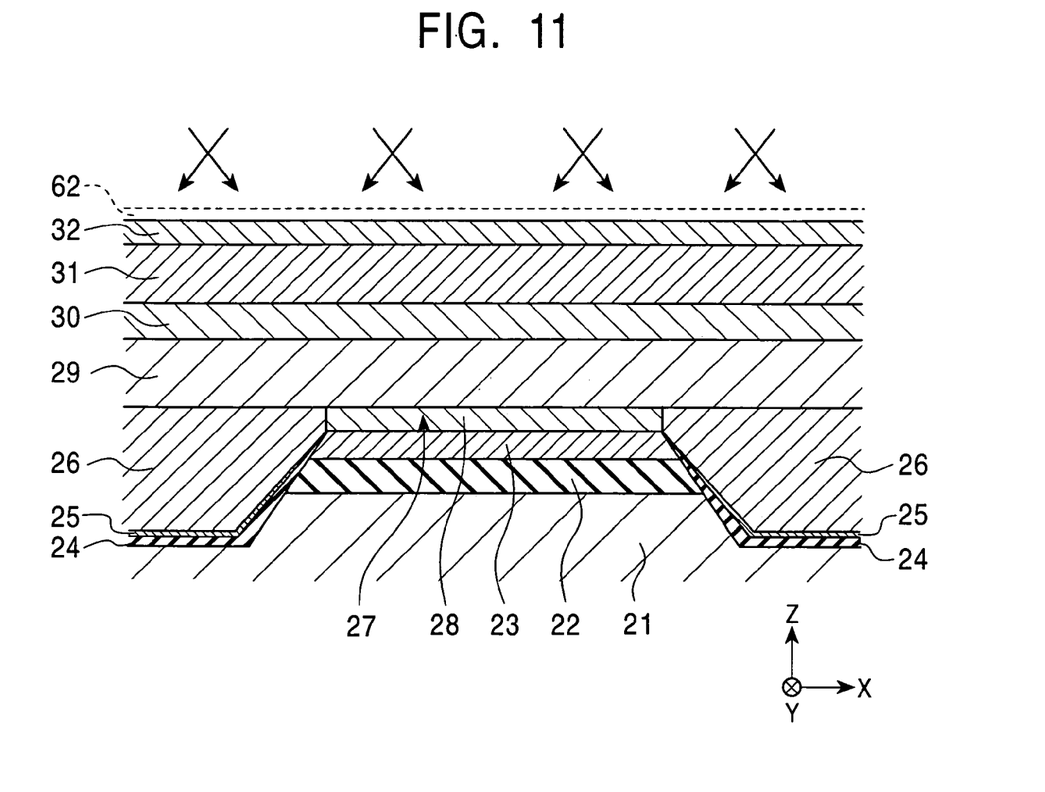
FIG. 11 is a sectional view which shows a step in the fabrication process subsequent to the step shown in FIG. 10.

In the step shown in FIG. 11, the second nonmagnetic layer 62 is removed by ion milling to expose the surface of the second spacer layer 32. In the ion milling process, ion milling with low energy may be used. The reason for this is that, since the second nonmagnetic layer 62 has an extremely small thickness of about 3 Å to 10 Å, removal of only the second nonmagnetic layer 62 can be easily controlled.

Ion milling with low energy is defined as ion milling using a beam of ions with a beam voltage (accelerating voltage) of less than 1,000 V. For example, a beam voltage of 100 to 500 V may be used. In this embodiment, an argon (Ar) ion beam with a low beam voltage of 200 V is used.

Figure 12:
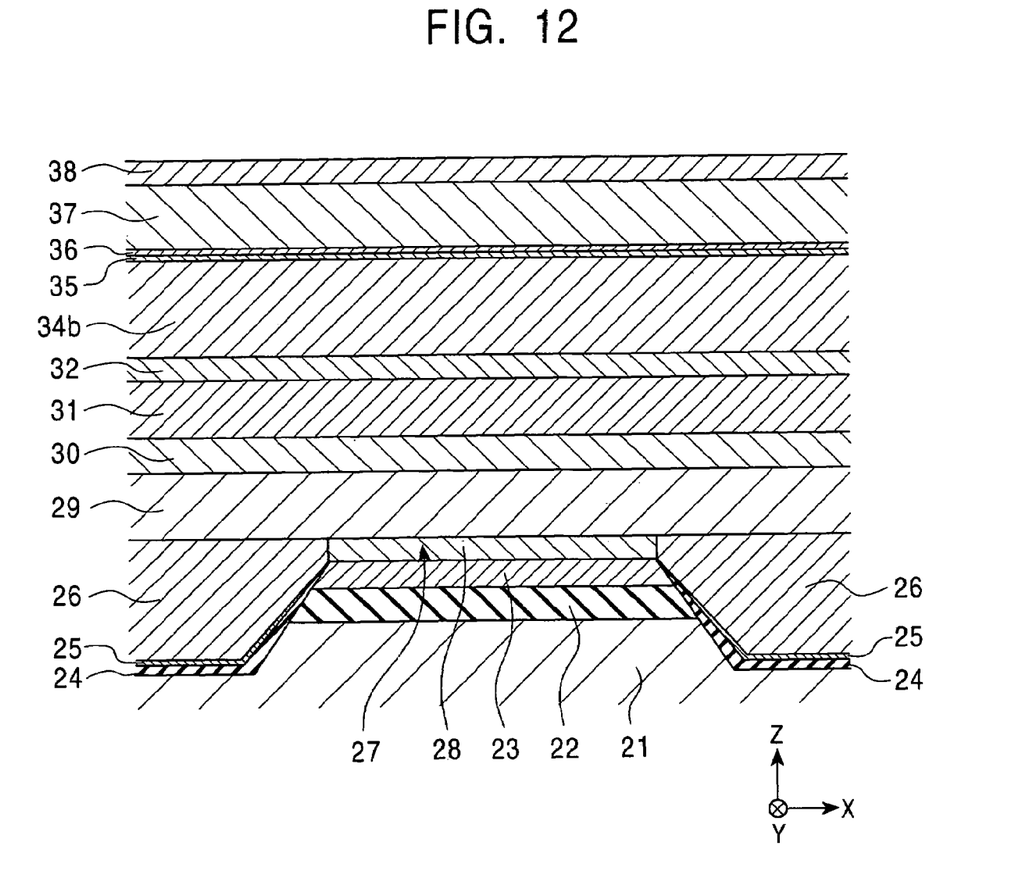
FIG. 12 is a sectional view which shows a step in the fabrication process subsequent to the step shown in FIG. 11.

Next, while maintaining the vacuum state from the ion milling with low energy, as shown in FIG. 12, a second antiferromagnetic layer 34b, a stopper layer 35, a protective layer 36, an electrode layer 37, and a protective layer 38 are continuously deposited. The thickness of the second antiferromagnetic layer 34b is larger than the thickness of the second spacer layer 32.

Figure 13:
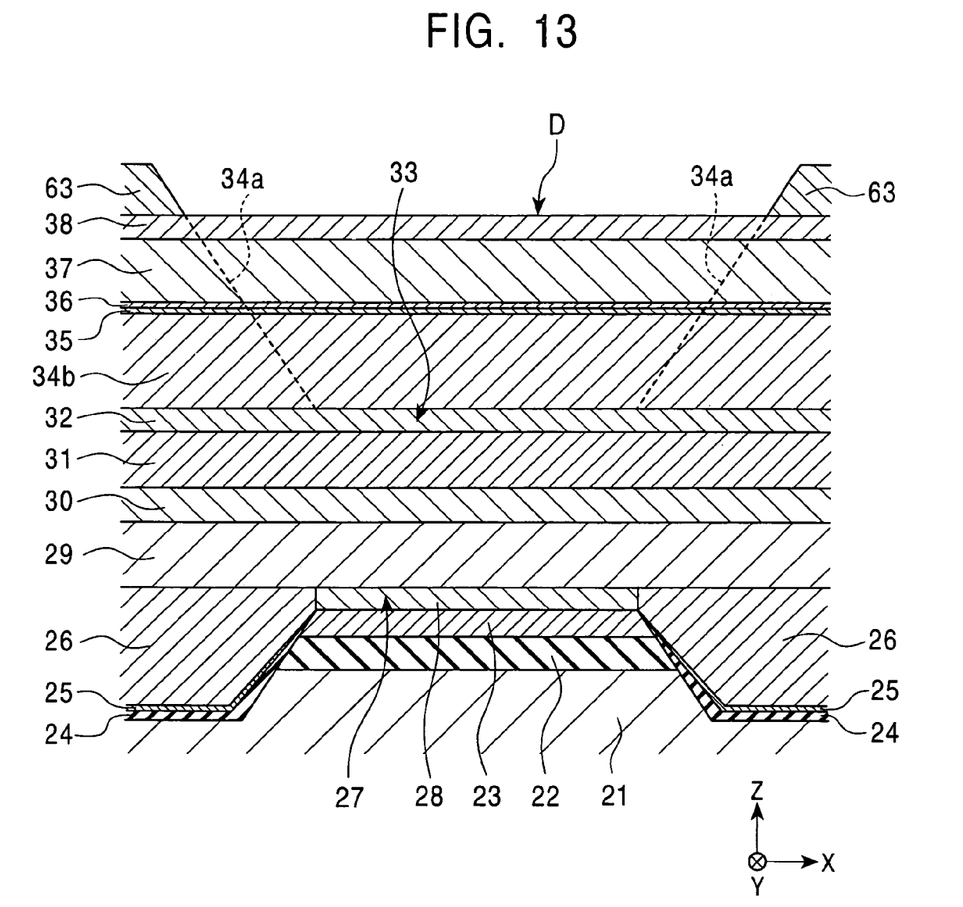
FIG. 13 is a sectional view which shows a step in the fabrication process subsequent to the step shown in FIG. 12.

In the step shown in FIG. 13, a pair of mask layers 63 are placed with a predetermined distance D therebetween on both ends in the track width direction of the protective layer 38. The mask layers 63 may be composed of a metal, such as Cr, or composed of a resist layer.

As shown in FIG. 13, the protective layer 38, the electrode layer 37, and the protective layer 36 which are exposed from the space between the mask layers 63 are removed by reactive ion etching (RIE) as indicated by the broken lines in the drawing. As the etching gas, $CF_4$, $C_3F_8$, a mixed gas of Ar and $CF_4$, a mixed gas of $C_3F_8$ and Ar is used. By the RIE process, the electrode layers 37 remain only on both ends in the track width direction of the magnetic sensing element. The RIE process is completed when the stopper layer 35 is exposed.

Next, the exposed stopper layer 35, the second antiferromagnetic layers 34b are removed by ion milling as indicated by the broken lines to expose the surface of the second spacer layer 32. The removal amount during the ion milling can be controlled by a secondary ion mass spectrometer (SIMS). When the second spacer layer 32 is exposed, ion milling is stopped. The ion milling may be performed until the upper surface of the second free magnetic layer 31 is exposed. In the ion milling process, the mask layers 63 are also removed. In the ion milling process, the second antiferromagnetic layers 34b are left on the side regions S with a second spacer section 33 having a predetermined distance in the track width direction therebetween.

Subsequently, an upper gap layer 39 and an upper shielding layer 40 are deposited as shown in FIG. 1, and a second annealing process is performed. While applying a second magnetic field antiparallel to the track width direction or at an angle of 45 degrees with respect to a direction antiparallel to the track width direction, annealing is performed at a second annealing temperature. Thereby, in the second spacer layer 32 under the second antiferromagnetic layers 34b and also in the second antiferromagnetic layers 34b, the disordered lattices are transformed into the ordered lattices to form second antiferromagnetic layers 34 in which the second antiferromagnetic layers 34b and the second spacer layer 32 are integrated. By the annealing process in the second magnetic field, an exchange coupling magnetic field is produced between the second free magnetic layer 31 and the second antiferromagnetic layer 34 in which the second antiferromagnetic layer 34b and the second spacer layer 32 are integrated, and thereby the magnetization direction of the second free magnetic layer 31 can be pinned antiparallel to the track width direction or at an angle of 45 degrees with respect to a direction antiparallel to the track width direction. For example, the second annealing temperature is set at 270° C., and the magnitude of the magnetic field is set at 8 to 30 kA/m, for example, at 24 kA/m. The magnitude of the second magnetic field in the annealing process is preferably smaller than the magnitude of the first magnetic field in the annealing process. Consequently, during annealing in the second magnetic field, it is possible to allow the magnetization direction of the first free magnetic layer 29 which has been pinned by annealing in the first magnetic field to remain pinned without being changed.

Since the thickness of the second spacer section 33, i.e., the second spacer layer 32 in the central region C is extremely thin, the disordered lattices are not transformed into the ordered lattices even by annealing in the second magnetic field, and the disordered crystal structure which does not exhibit antiferromagnetism is maintained. Consequently, in each side region S, an exchange anisotropic magnetic field is produced between the second free magnetic layer 31 and the second antiferromagnetic layer 34 in which the second antiferromagnetic layer 34b and the second spacer layer 32 are integrated. Thereby, the magnetization direction of the second free magnetic layer 31 can be pinned antiparallel to the track width direction or at an angle of 45 degrees with respect to a direction antiparallel to the track width direction. On the other hand, in the second spacer section 33, i.e., in the central region C, the second antiferromagnetic layer 34 is not formed, and only the second spacer layer 32 is formed with a thickness which maintains the disordered crystal structure and does not exhibit antiferromagnetism. Consequently, the magnetization of the second free magnetic layer 31 in the central region C can be weakly aligned in a single-domain state so that the magnetization direction is rotated by an external magnetic field.

In the fabrication method of the present invention, the second free magnetic layer 31 and the second spacer layer 32 are continuously deposited in a vacuum, and then the second spacer layer 32 is protected from oxidation by the second nonmagnetic layer 62. After the second nonmagnetic layer 62 is removed in a vacuum, the second antiferromagnetic layer 34b is deposited on the second spacer layer 32. By annealing in a magnetic field, antiferromagnetism is imparted to the second spacer layer 32 formed on each side region S of the second free magnetic layer 31. Consequently, an exchange coupling magnetic field with a proper magnitude can be produced between the second spacer layer 32 and the side region S of the second free magnetic layer 31.

In order to fabricate the CPP magnetic sensing element 120 shown in FIG. 6, in the step shown in FIG. 7, the seed layer 23 is deposited on the lower shielding layer 21 without forming the lower gap layer 22. In the step shown in FIG. 12, the electrode layer 37 and the protective layer 38 are not formed. In the step shown in FIG. 13, the insulating layers 150 are formed over the protective layers 36 and the side faces 34a of the second antiferromagnetic layers 34, and then the upper shielding layer 40 which also functions are an electrode layer is formed.

In the magnetic sensing element 20 shown in FIG. 1 and the magnetic sensing element 120 shown in FIG. 6, examples in which the upper surfaces of the first antiferromagnetic layers 26 and the first spacer layer 28 form a continuous planar surface have been described. However, the present invention is not limited thereto. The upper surfaces of the first antiferromagnetic layers 26 and the upper surface of the first spacer layer 28 may form a continuous curved surface.

Even if the magnetic sensing element 20 or 120 has such a construction, since the first spacer layer 28 and the first free magnetic layer 29 are continuously deposited, the first spacer layer 28 formed on the first antiferromagnetic layer 26 is integrated into the first antiferromagnetic layer 26 to form an antiferromagnetic layer, and an exchange coupling magnetic field with an appropriate magnitude can be produced between the first antiferromagnetic layer 26 and each side region S of the first free magnetic layer 29. Consequently, the magnetization of each side region S of the first free magnetic layer 29 can be strongly pinned in the track width direction, and side reading can be prevented. Since a thick antiferromagnetic layer is not present in the central region C, the overall thickness of the magnetic sensing element in the central region C can be decreased and the gap length Gl can be decreased.

As described above in detail, in the magnetic sensing element of the present invention, the first spacer layer having the same composition as that of the first antiferromagnetic layers and having a smaller thickness than that of the first antiferromagnetic layers is formed on the upper surfaces of the first antiferromagnetic layers and between the first spacer section and the lower surface of the first free magnetic layer. Since the first spacer layer and the first free magnetic layer can be continuously formed, the magnitude of the exchange coupling magnetic field can be increased. The upper surface of the first spacer layer can be formed flatly, and the first free magnetic layer and the second free magnetic layer deposited above the first free magnetic layer can also be formed flatly. Consequently, it is possible to fabricate a magnetic sensing element in which side reading can be prevented, and read sensitivity can be improved, and which is suitable for gap narrowing.

What is claimed is:

1. A magnetic sensing element comprising:
a pair of first antiferromagnetic layers separated by a first spacer section having a predetermined distance in a track width direction;
a first spacer layer having a disordered crystal structure disposed in the first spacer section, the first spacer layer having the same composition as that of the first antiferromagnetic layers and having a thickness that is smaller than that of the first antiferromagnetic layers;
a first free magnetic layer disposed over the first antiferromagnetic layers and the first spacer layer;
a nonmagnetic interlayer disposed on the first free magnetic layer;
a second free magnetic layer disposed on the nonmagnetic interlayer; and
a pair of second antiferromagnetic layers separated by a second spacer section having the predetermined distance in the track width direction on the second free magnetic layer,
wherein upper surfaces of the first antiferromagnetic layers and upper surface of the first spacer layer form a continuous surface, and the first free magnetic layer is disposed on the continuous surface; and
wherein magnetization directions of the first free magnetic layer and the second free magnetic layer are rotatable in response to an external magnetic field, causing a change in resistance of the magnetic sensing element.

2. A magnetic sensing element according to claim 1, further comprising a second spacer layer disposed in the second spacer section in contact with the second free magnetic layer, the second spacer layer having the same composition as that of the second antiferromagnetic layers, having a thickness that is smaller than that of the second antiferromagnetic layers, and having a disordered crystal structure.

3. A magnetic sensing element according to claim 2, wherein the thickness of the first spacer layer is 5 Å to 50 Å.

4. A magnetic sensing element according to claim 2, wherein the thickness of the second spacer layer is 5 Å to 50 Å.

5. A magnetic sensing element according to claim 1, further comprising a bias layer comprising a hard magnetic material extending behind the first free magnetic layer and the second free magnetic layer, in a height direction, with an insulating layer therebetween.

6. A magnetic sensing element according to claim 1, wherein the continuous surface is a planarized surface.

* * * * *